(12) United States Patent
Bishop

(10) Patent No.: US 9,892,654 B2
(45) Date of Patent: Feb. 13, 2018

(54) ILLUSTRATED PHONICS BOARD

(71) Applicant: Elizabeth Bishop, Two Harbors, MN (US)

(72) Inventor: Elizabeth Bishop, Two Harbors, MN (US)

(*) Notice: Subject to any disclaimer, the term of this patent is extended or adjusted under 35 U.S.C. 154(b) by 215 days.

(21) Appl. No.: 14/829,814

(22) Filed: Aug. 19, 2015

(65) Prior Publication Data

US 2016/0063885 A1 Mar. 3, 2016

Related U.S. Application Data

(60) Provisional application No. 62/070,497, filed on Aug. 26, 2014.

(51) Int. Cl.
*G09B 19/00* (2006.01)
*G09B 17/00* (2006.01)

(52) U.S. Cl.
CPC .................................. *G09B 17/00* (2013.01)

(58) Field of Classification Search
None
See application file for complete search history.

(56) References Cited

U.S. PATENT DOCUMENTS

| 1,019,545 | A | * | 3/1912 | Southworth | G09B 17/00 40/495 |
| 4,389,193 | A | * | 6/1983 | Phillips | G09B 1/22 434/174 |
| 5,775,693 | A | * | 7/1998 | Clancy | A63F 9/0857 273/153 S |
| 6,648,647 | B2 | * | 11/2003 | Wood | G09B 1/18 434/174 |
| 6,869,286 | B2 | * | 3/2005 | Furry | G09B 19/04 434/156 |
| 2017/0076625 | A1 | * | 3/2017 | Bonner | G09B 17/00 |

* cited by examiner

*Primary Examiner* — Sunit Pandya
(74) *Attorney, Agent, or Firm* — Winthrop & Weinstine, P.A.

(57) ABSTRACT

An illustrated phonics board is provided offering a simplified language learning system using visuals, and moving selectors that are easily manipulated to form simple words. To use, the operator chooses letters from three moving selectors to form a three letter word that shows within a target window. The art on the board provides readily available visual prompts, a quick reference to letters and their phonetic sounds for beginning readers.

13 Claims, 3 Drawing Sheets

ILLUSTRATED PHONICS BOARD

CROSS-REFERENCE TO RELATED APPLICATIONS

This application claims priority to provisional patent application, U.S. App. Ser. No. 62/070,497, entitled "Illustrated Phonics Board" and filed on Aug. 26, 2014.

FIELD OF THE INVENTION

The present disclosure relates to systems and methods for displaying phonetics to assist elementary students in learning phonics.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Learning to read should be fun and not passive, children should be able to use their eyes, ears and even their fingers to have a good experience. Ideally, children should learn through their discovery of new things, which does not happen very often in reading class, using most reading instruction methods. Then there is the problem that most teachers have introducing consonant sounds. Mostly, they are introduced by attaching a vowel, usually the e. To follow, D, a consonant, is introduced as D-e. As an example, the word, DOG is presented as D-e-O-G, two vowels are in that short word, which is puzzling to many young readers. It is desirable to have a learning tool that creates active learning and provides a better introduction to consonant sounds resulting in improved outcomes and accelerated reading capabilities for some students.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a learning tool comprising an illustrated phonics board. The illustrated phonics board comprises a panel having a front and a back, wherein the front comprises a window and a plurality of phonemes having an illustrative pronouncing symbol for each phoneme; at least three movable selectors comprising a first consonant selector comprising a plurality of consonants arranged in a first direction, a second consonant selector comprising a plurality of consonants arranged in a second direction, and a vowel selector, wherein moving the first consonant selector, the second consonant selector, and the vowel selector relative to one another displays selected consonants and selected vowels in the panel window to form a word. In at least one embodiment, the learning tool further comprises at least two vowel-strip guides, one above and one below the window. In at least one embodiment, the plurality of phonemes comprises vowel phonemes and consonant phonemes and a separation element is disposed between the vowel phonemes and the consonant phonemes. In some embodiments, the vowel selector is a strip. In some embodiments, the first consonant selector and the second consonant selector are rotating circular flat planes. In at least one embodiment, the first consonant selector can be rotated to display a first consonant in a first position in the window, wherein the second consonant can be rotated to display a second consonant in a second position in the window, and wherein the vowel selector can be positioned to display a vowel in a third position between the first position and the second position. In some embodiments, the learning tool further comprises a sign with a letter symbol and a highlighting symbol surrounding the letter symbol. In at least one embodiment, the sign can be displayed at an end of the window. In some embodiments, the learning tool comprises at least one tag having a notch, wherein the at least one tag can be displayed at either end of the window.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous system and methods for improving outcomes and reading abilities for students. Particularly, the present disclosure relates to a novel and advantageous learning tool, namely, an illustrated phonics board, and methods for helping students learn phonics using the learning tool.

Figure 1:
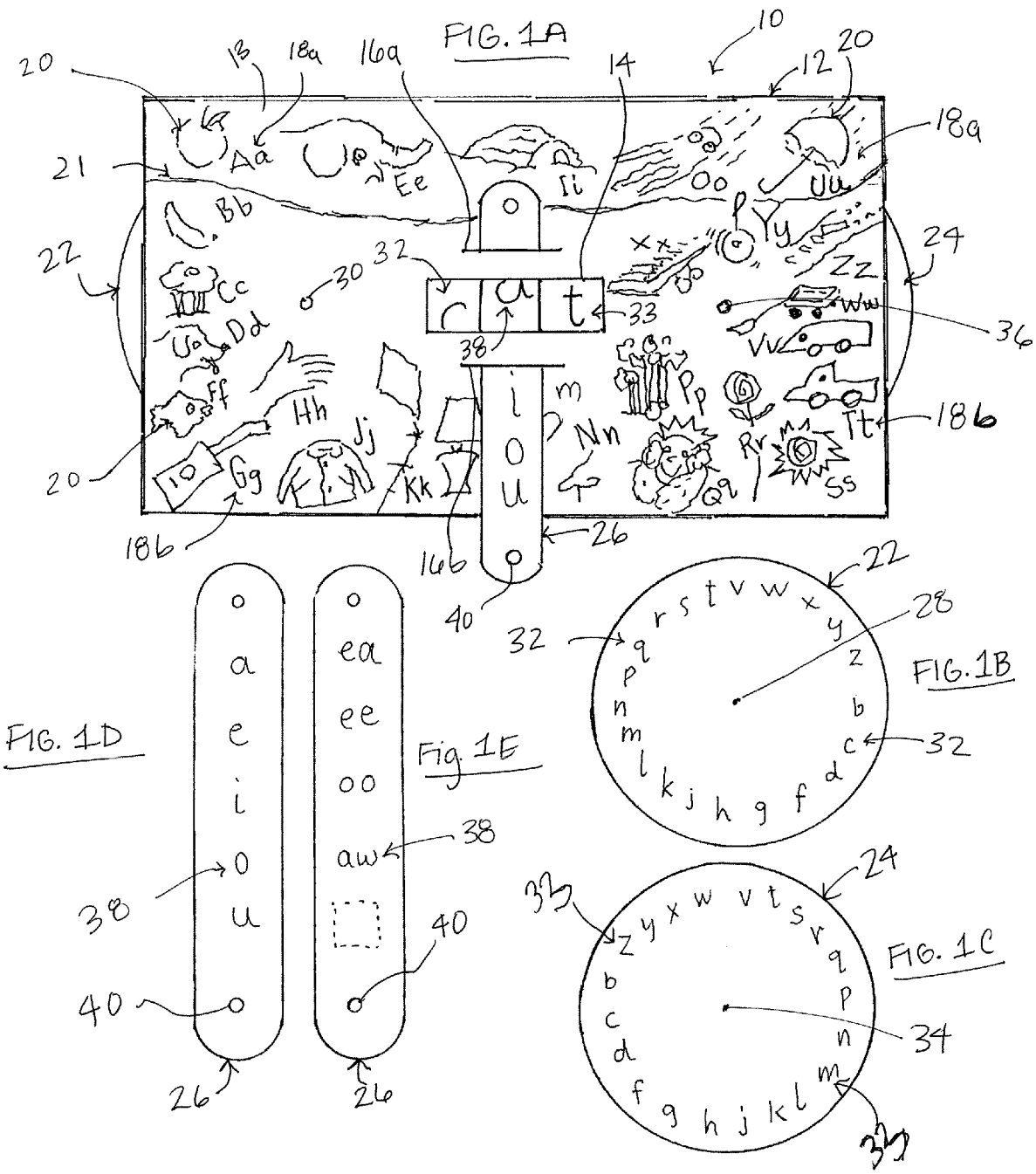
FIGS. 1A-1E show front views of one embodiment of the learning tool of the present invention.

FIGS. 1A-1E shows one embodiment of the illustrated phonics board 10, includes a panel 12 having a front 13 and a back (not shown). The phonics board 10 may comprise hardboard (sometimes called high-density fiberboard), wood, paper board, cardboard, plastic or metal. The front 13 has a window 14 cut into the panel 12, at least two vowel strip guides 16a and 16b, and a number of phonemes 18 in upper and lower case forms with an illustrative pronouncing symbol 20 for each. A separation element 21 divides the vowels 18a from the consonants 18b to show distinction between the two. Window 14 shows a three letter word that is formed by manipulating at least three movable selectors 22, 24, 26. The movable selectors 22, 24, 26 may comprise rotating circular flat planes or sliding elements. As shown in FIGS. 1A-1E, a first consonant selector 22 is comprised of a rotating circular flat plane with a coupling puncture 28 in the center and coupled to the board from one side with a fastener 30, which may be a metal fastener or comprise other materials. In at least one embodiment, the first consonant selector comprises a number of consonants 32 arranged in a first direction. In at least one embodiment, as shown in FIG. 1B, the first direction is clockwise. As shown in FIGS. 1A-1E, a second consonant selector 24 is comprised of a rotating circular flat plane with a coupling puncture 34 in the center and coupled to the board from one side with a fastener 36, which may be a metal fastener or comprise other materials. In at least one embodiment, the second consonant selector comprises a number of consonants 32 arranged in a second direction opposite the first direction. In at least one embodiment, as shown in FIG. 1C, the second direction is counterclockwise.

As shown in FIGS. 1A-1E, a sliding vowel selector 26 is disposed between the first consonant selector 22 and the second consonant selector 24. The sliding vowel selector 26 as shown in FIGS. 1D-1E comprises a strip that has a number of vowel sounds 38. In at least one embodiment, the vertical vowel selector is double faced with five simple vowels on one side (as shown in FIG. 1D) and selected vowel blends on the other (as shown in FIG. 1E), with space to write in more of operators choosing. The sliding vowel selector 26 may be directed between the upper vowel strip guide 16a, through window 14 between the consonant selectors 22, 24, and finally through the lower slit 16b. The sliding vowel selector 26 may further comprise a retention element 40 at the ends of the vowel selector, which can be used to stop the selector from sliding out. In at least one embodiment, the retention element 40 comprises a hole and a string can be inserted to tie the sliding vowel selector 26 to keep it in a particular position.

Although the embodiment shown in FIGS. 1A-1E shows a window 14 capable of containing up to three letters, it is contemplated by this invention that addition sliding letter selectors or movable selectors can be added between the first selector 22 and the second selector 24. Additionally while the first selector 22 and the second selector 24 are described herein as having consonants and the sliding selector 26 has vowels, it is contemplated by this invention that the selectors 22, 24, 26 may include any letter or letter blend.

To form a word, a user (such as a teacher, instructor parent, or student) may rotate one or both of the consonant selectors 22 and 24 and can slide the sliding vowel selector vertically relative to the window. Referring to the phonemes 18 and the illustrative pronouncing symbol, a student can begin to form the word verbally.

Figure 2:
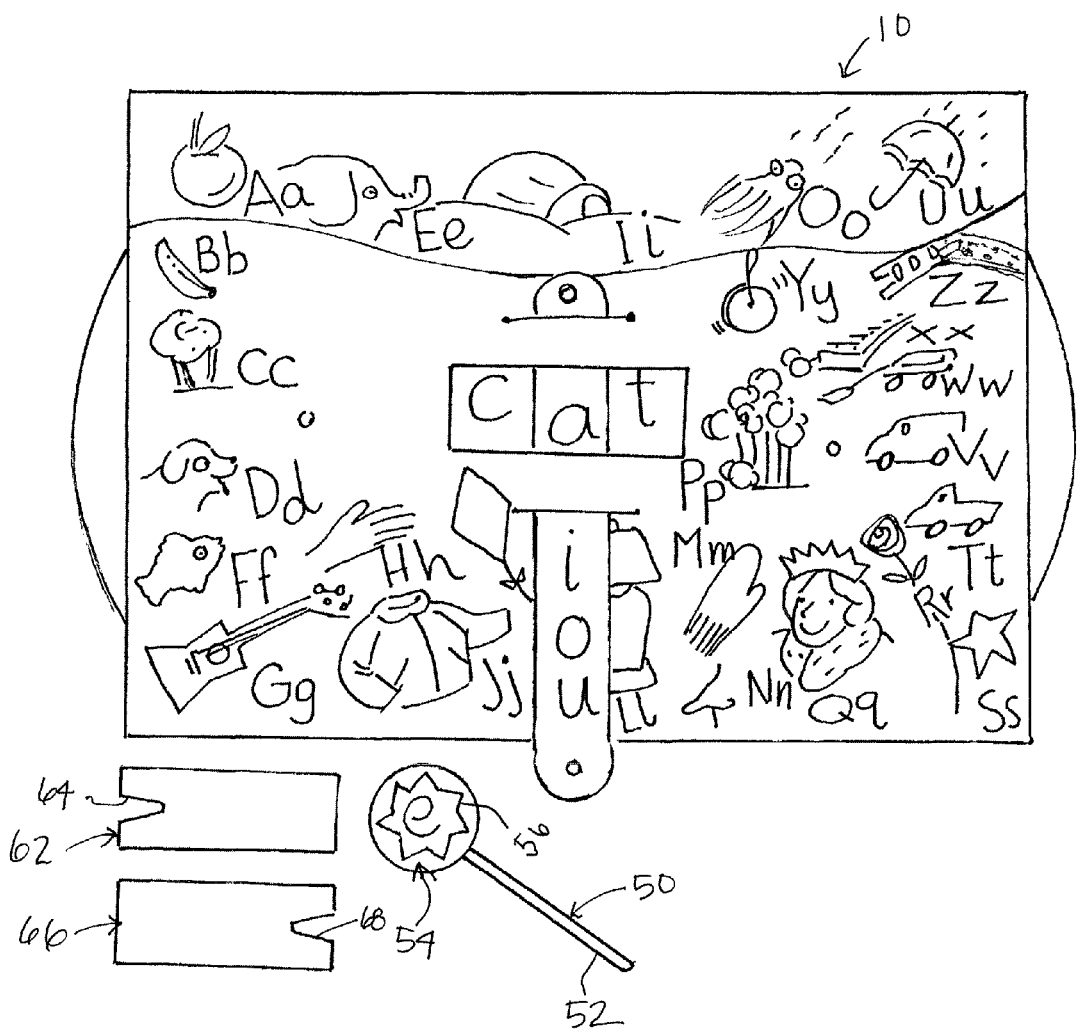
FIG. 2 is a front view of one embodiment of the learning tool of the present invention.
Figure 3A:
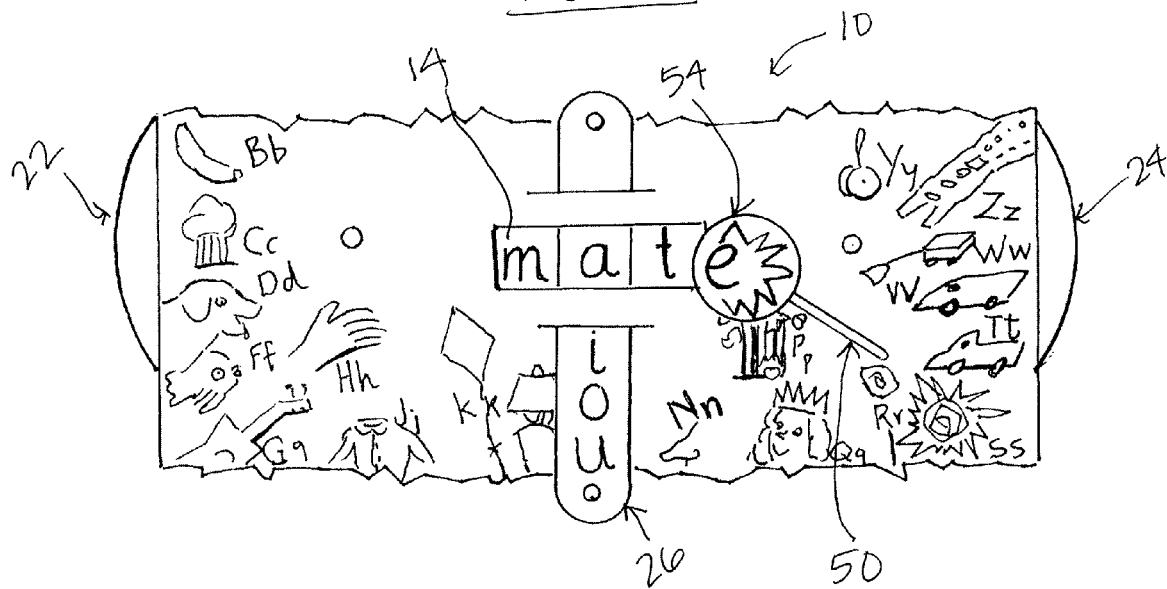
FIGS. 3a-3b are front views of one screenshot of one embodiment of a user interface of the system.

FIG. 2-3 show additional features that may be added to the illustrated phonics board to make additional words. FIG. 2 shows a sign 50 that comprises a shaft 52 with a letter symbol 54 attached to one end of the shaft 52. In at least one embodiment, the letter symbol 54 is a lowercase e. In at least one embodiment the letter symbol 54 is surrounded by a highlighting symbol 56. In at least one embodiment, sign 50 appears similar to a wand. As shown in FIG. 3A, the sign 50 can be added to the end of the displayed word in window 14 (as shown M-A-T), the short vowel within the displayed word, becomes a long vowel sound and a new word is formed (as shown M-A-T-E).

Figure 3B:
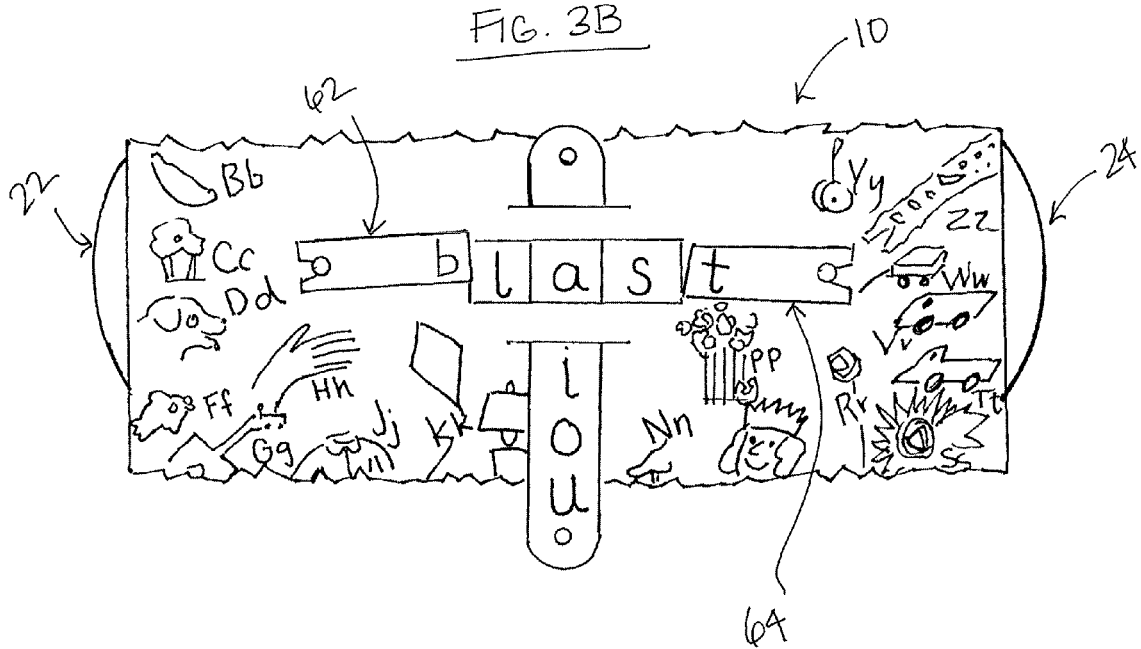

FIG. 2 also shows tags 62, 66 that can be used to teach lessons in consonant blends. Tags 62, 66 may be preprinted with a consonant or may allow for erasable writing with a erasable marker. As shown each tag has a notch 64, 68 on an end. As shown in FIG. 3B, the notch can surround the fastener 30, 36 and allows additional letters to be added to a first and/or second end of the letters displayed in the window 14. These tags can be used for teaching consonant blends. For example, by adding and second end left and 34 right used to teach lessons in consonant blends. With an erasable marker to write a letter, or letters on the tags before, and, or, after, the three letter word in the target window, the simple consonant becomes a consonant blend. An example. By adding the letter b to the beginning of the letters len in the window, and a d at the end, the word becomes blend.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

I claim:

1. A learning tool comprising an illustrated phonics board comprising:
   a panel having a front and a back, wherein the front comprises a window and a plurality of phonemes having an illustrative pronouncing symbol for each phoneme; and
   at least three movable selectors comprising a first consonant selector comprising a plurality of consonants arranged in a first direction, a second consonant selector comprising a plurality of consonants arranged in a second direction, and a sliding vowel selector strip, wherein moving the first consonant selector, the second consonant selector, and the sliding vowel selector strip relative to one another displays selected consonants and selected vowels in the panel window to form a word.

2. The learning tool of claim 1, wherein the panel further comprises at least two vowel strip slits, wherein the sliding vowel selector strip is inserted into one or more vowel strip slits.

3. The learning tool of claim 1, wherein the plurality of phonemes comprises vowel phonemes and consonant phonemes and a separation element is disposed between the vowel phonemes and the consonant phonemes.

4. The learning tool of claim 1, wherein the first consonant selector is a rotating circular flat plane.

5. The learning tool of claim 4, wherein the second consonant selector is a rotating circular flat plane.

6. The learning tool of claim 5, wherein the first consonant selector can be rotated to display a first consonant in a first position in the window, wherein the second consonant selector can be rotated to display a second consonant in a second position in the window, and wherein the sliding vowel selector strip can be slid vertically relative to the window to display a vowel in a third position in the window, the third position between the first position and the second position.

7. The learning tool of claim 1, wherein the first consonant selector and second consonant selector are each connected to the panel with a fastener.

8. The learning tool of claim 1, wherein the sliding vowel selector strip comprises a retention element.

9. The learning tool of claim 1, further comprising a sign with a letter symbol and a highlighting symbol surrounding the letter symbol.

10. The learning tool of claim 1, wherein the sign can be displayed at an end of the window.

11. The learning tool of claim 1, comprising at least one tag wherein the tag can be displayed at either end of the window.

12. The learning tool of claim 1, wherein the sliding vowel selector strip has a first side and a second side, wherein the first side comprises five simple vowels and the second side comprises vowel blends.

13. The learning tool of claim 1, wherein the sliding vowel selector strip comprises only vowels and vowel blends and the first consonant selector comprises consonants.

\* \* \* \* \*